United States Patent
Suenaga et al.

(12)

(10) Patent No.: US 6,656,386 B2
(45) Date of Patent: Dec. 2, 2003

(54) WHOLLY AROMATIC HEAT-STABLE LIQUID CRYSTALLINE POLYESTER RESIN COMPOSITION WITH IMPROVED MELT FLOWABILITY

(75) Inventors: Jun-ichi Suenaga, Souraka-gun (JP); Takamasa Owaki, Ikeda (JP); Masaru Egawa, Amagasaki (JP)

(73) Assignee: Kabushiki Kaisha Ueno Seiyaku Oyo Kenkujo, Osaka-fu (JP)

( * ) Notice: Subject to any disclaimer, the term of this patent is extended or adjusted under 35 U.S.C. 154(b) by 0 days.

(21) Appl. No.: 10/079,417

(22) Filed: Feb. 22, 2002

(65) Prior Publication Data
US 2003/0008979 A1 Jan. 9, 2003

(30) Foreign Application Priority Data
Feb. 23, 2001 (JP) ........................................ 2001-048561

(51) Int. Cl.⁷ ............................................... C09K 19/32
(52) U.S. Cl. ........................... 252/299.62; 252/299.64; 252/299.65; 252/299.66; 252/299.67
(58) Field of Search ........................ 252/299.01, 299.67, 252/299.66, 299.68, 299.62, 299.64, 299.65; 428/1

(56) References Cited

U.S. PATENT DOCUMENTS

| | | | | | |
|---|---|---|---|---|---|
| 4,764,582 A | * | 8/1988 | Hisgen et al. | ............... | 528/183 |
| 5,096,957 A | * | 3/1992 | Duska | ........................ | 524/434 |
| 5,147,967 A | * | 9/1992 | Stern et al. | .................. | 528/193 |
| 5,216,092 A | * | 6/1993 | Huspeni et al. | ............. | 525/444 |

OTHER PUBLICATIONS

Stachowski, M.J; DiBenedetto, A.T.; "Compatibility in Blnary Blends of Thermotropic Liquid Crystal Polymers". Polymer Engineering and Science, May 1998, Vol 38, No. 5 pp 716–726.*

* cited by examiner

Primary Examiner—Mark F. Huff
Assistant Examiner—Jennifer R. Sadula
(74) Attorney, Agent, or Firm—Sughrue Mion, PLLC

(57) ABSTRACT

A wholly aromatic liquid crystalline polyester resin composition comprising about 97–60 parts by weight of a wholly aromatic polyester resin (A) having melting peak determined by DSC equal to or higher than 310° C.; and about 3–40 parts by weight of a wholly aromatic polyester resin (B) having melting peak determined by DSC equal to or lower than 300° C. is provided. The novel liquid crystalline polyester resin composition of the present invention exhibits an improved melt flowability and can provide a molded article having reflow-soldering heat resistance.

5 Claims, No Drawings

WHOLLY AROMATIC HEAT-STABLE LIQUID CRYSTALLINE POLYESTER RESIN COMPOSITION WITH IMPROVED MELT FLOWABILITY

BACKGROUND OF THE INVENTION

1. Field of the Invention

The present invention relates to a wholly aromatic liquid crystalline polyester resin composition which exhibits a good combination of improved melt flowing property and high heat resistance.

2. Related Arts

Liquid crystalline polyester resins (hereafter referred to as LCP(s)) have inflexible molecular structure and exhibit anisotropic melt phases. Upon molding, the inflexible moleculars highly orient to give molded products with excellent mechanical properties as well as high heat resistance. Due to these outstanding properties, LCPs are used as super engineering plastics and have attracted the attention of the art.

LCPs were first brought to the market in 1980s and the LCP market has expanded since then because of their excellent mechanical properties, soldering heat-resistance, excellent molding properties and the other properties. LCPs are especially admired in the field of electronic and electric devices wherein light, thin and small parts are preferred since they exhibit good melt flowability and cause less flash formation upon molding, Along with the recent rapid advances in information technology, even smaller and thinner devices are desired in the electric and electronic fields, and therefore LCPs with improved heat-resistance as well as improved melt flowability are desired.

In order to be resistant to the reflow-soldering temperature, the melting peak of LCP, which is determined with differential scanning calorimetry (DSC) should be more than 310° C. However, setting speed of such heat-resistant LCP as above is generally high and the flowability of the fused resin is low. In order to improve the flowability of a fused LCP, Japanese Patent Application Laid Open No. 03-252457 discloses a resin composition obtained by compounding a small amount of p-hydroxybenzoic acid (PHB) oligomer into the LCP; Japanese Patent No. 2823873 discloses a resin composition with lower melt viscosity obtained by compounding a LCP having low molecular weight into a conventional LCP. Although the above prior art compositions achieved some improved melt flowability, there are several practical problems such as decreased heat-resistance and mechanical strength of the molded articles obtained from the composition.

It was also proposed to compound other resins into a conventional LCP to improve its melt flowability. However, compatibility of the LCP with the other resin is generally poor and therefore, mechanical strength of the resulting molded article is significantly affected. If the other resin is blended into the LCP, the resulting composition offers a molded article with only a reduced heat resistance and therefore, cannot be processed with reflow-soldering procedure. Further more, proposed methods for improving melt flowability of a LCP by means of controlling its melt viscosity, admixing fine fillers or the like could not give practically useful compositions.

Further more, Japanese Patent No. 2611376 disclose a resin composition with improved flowing property obtained by blending two LCPs having different heat deflection temperatures, and U.S. Pat. No. 5,976,406 disclosed a resin composition with improved flowability obtained by blending two LCPs having different flow temperatures. However, mechanical properties or heat resistance of the molded articles obtained by using said LCPs were not enough.

SUMMARY OF THE INVENTION

The object of the present invention is to improve melt flowability of a liquid crystalline polyester resin while keeping the conventional mechanical properties and heat resistance of the molded article made from the same so that the article can be subjected to the reflow-soldering process.

The present inventors studied to improve melt flowability of heat-resistant liquid crystalline polyester resin of which melting peak is equal to or higher than 310° C., and have surprisingly found that by compounding a specific amount of a liquid crystalline polyester resin of which melting peak is not greater than 300° C. into the original resin, an improved melt flowability was attained.

Accordingly, the present invention provides a wholly aromatic liquid crystalline resin composition comprising 97–60 parts by weight of a wholly aromatic liquid crystalline polyester resin (A) having melting peak determined by differential scanning calorimetry (DSC) equal to or higher than 310° C.; and 3–40 parts by weight of a wholly aromatic liquid crystalline polyester resin (B) having melting peak determined by differential scanning calorimetry (DSC) equal to or lower than 300° C.

Said composition exhibits an improved melt flowability than that of the liquid crystalline polyester resin (A) alone.

The present invention also provides a method to improve melt flowability of a wholly aromatic liquid crystalline polyester resin (A) having melting peak determined by differential scanning calorimetry equal to or higher than 310° C., comprising the step of compounding 3–40 parts by weight of a wholly aromatic liquid crystalline polyester resin (B) having melting peak determined by differential scanning calorimetry equal to or lower than 300° C. into 97–60 parts by weight of the liquid crystalline polyester resin (A).

The present invention further provides a molded article prepared by using the wholly aromatic liquid crystalline polyester resin composition of the present invention.

DETAILED DESCRIPTION OF THE INVENTION

The melting peak of a liquid crystalline polyester resin or liquid crystalline polyester resin composition used herein is determined by means of differential scanning calorimetry (DSC). The detailed method for determination is as follows:

The differential scanning calorimeter DSC-6200 (Seiko Instruments Inc., Chiba, Japan) or a same type of DSC device may be used. The measurement may be carried out at the sensitivity of 1.6 $\mu$W. The LCPs to be examined are pulverized into fine particles and 20 mg of the powder are weighted. The powder is heated under stream of nitrogen gas from 50° C. to 375° C. at the rate of 20° C./minute, kept at 375° C. for 10 minutes (Step 1). Then the composition is cooled to 50° C. at the rate of 20° C./minute (Step 2) and then, heated again to 395° C. at the same rate (Step 3). Endothermic peak found in the third step is recorded as melting peak.

Examples of the monomers used for preparing LCPs (A) or (B) used herein may include aromatic hydroxycarboxylic acids, aromatic dicarboxylic acids, aromatic bivalent phenols, aromatic diamines, aromatic hydroxy amines, and aromatic aminocarboxylic acids.

Examples of aromatic hydroxycarboxylic acids include p-hydroxy benzoic acid, 2-hydroxy-3-naphthoic acid, 2-hydroxy-6-naphthoic acid, 2-hydroxy-7-naphthoic acid, 3-methyl-4-hydroxybenzoic acid, 3,5-dimethyl-4-hydroxy benzoic acid, 2,6-dimethyl-4-hydroxybenzoic acid, 2-hydroxy-5-methyl-6-naphthoic acid, 2-hydroxy-5,7-dimethyl-6-naphthoic acid, 3-chloro-4-hydroxybenzoic acid, 2-chloro-4-hydroxybenzoic acid, 2,3-dichloro-4-hydroxybenzoic acid, 3-bromo-4-hydroxybenzoic acid, 2-hydroxy-5-chloro-6-naphthoic acid, 2-hydroxy-7-chloro-6-naphthoic acid, 2-hydroxy-5,7-dichloro-6-naphthoic acid and 4-hydroxy-4'-biphenylcarboxylic acid, and alkyl, alkoxy and halogen substituted derivatives thereof as well as ester forming derivatives thereof. Among the above, p-hydroxy benzoic acid and 2-hydroxy-6-naphthoic acid are preferable.

Examples of aromatic dicarboxylic acids include terephthalic acid, chloroterephthalic acid, dichloro terephthalic acid, bromoterephthalic acid, methylterephthalic acid, dimethylterephthalic acid, ethylterephthalic acid, methoxyterephthalic acid, ethoxyterephthalic acid, isophthalic acid, 4,4'-biphenyldicarboxylic acid, 3,4'-biphenyldicarboxylic acid, 4,4"-terphenyidicarboxylic acid, 2,6-naphthalene dicarboxylic acid, 2,7-naphthalene-dicarboxylic acid, 1,6-naphthalene-dicarboxylic acid, diphenylether-4,4'-dicarboxylic acid and alkyl, alkoxy and halogen substituted derivatives thereof as well as ester forming derivatives thereof. Among the above, terephthalic acid, 2,6-naphthalenedicarboxylic acid are preferable.

Examples of aromatic bivalent phenols include hydroquinone, resorcinol, 4,4-biphenol, 2,6-naphthalenediol, 2,7-naphthalenediol, 4,4'-dihydroxydiphenyl ether, 4,4"-dihydroxyterphenyl, 3,3'-biphenol, 3,3'-dihydroxydiphenylether and 2,2-bis(4-hydroxyphenyl) propane. Among the above, hydroquinone and 4,4'-biphenol are preferable.

Examples of aromatic diamines, aromatic hydroxy amines, and aromatic amino carboxylic acid include aromatic hydroxyamines such as p-aminophenol, N-methylaminophenol, 3-aminophenol, 3-methyl-4-aminophenol, 4-amino-1-naphthol, 4-amino-4'-hydroxybiphenyl, 4-amino-4'-hydroxydiphenylether, 4-amino-4'-hydroxydiphenylmethane, 4-amino-4'-hydroxydiphenylsulfide and 4-amino-4'-hydroxydiphenyl sulfone; aromatic diamines such as 1,4-phenylenediamine, N-methyl-1,4-phenylenediaimine, N,N'-dimethyl-1,4-phenylenediamine, 4,4'-diaminodiphenylsulfide, 4,4'-diaminodiphenylmethane and 4,4'-diaminodiphenylether; aromatic aminocarboxylic acids such as 4-aminobenzoic acid, 2-aminonaphthoic acid. Further the monomers may contain aliphatic or alicyclic bivalent alcohols such as ethylene glycol, propylene glycol, 1,4-buthanediol, 1,4-cyclohexandimethanol and neopentyl glycol.

The wholly aromatic liquid crystalline polyester resins used as LCP(A) in the present invention may comprise any combination of the monomers listed above as long as the melting peak of resulting LCP is equal to or higher than 310° C. Examples of preferred LCP(A) include followings:

polycondensed compound of p-hydroxybenzoic acid, 2-hydroxy-6-naphthoic acid, hydroquinone and terephthalic acid;

polycondensed compound of p-hydroxybenzoic acid, 4,4'-biphenol, hydroquinone, terephthalic acid and 2,6-naphthalene dicarboxylic acid;

polycondensed compound of p-hydroxybenzoic acid, 2-hydroxy-6-naphthoic acid, 4,4'-biphenol, terephthalic acid and p-aminophenol;

polycondensed compound of p-hydroxybenzoic acid, 2-hydroxy-6-naphthoic acid, hydroquinone and 2,6-naphthalene dicarboxylic acid; and polycondensed compound of p-hydroxybenzoic acid, 4,4'-biphenol, terephthalic acid and isophthalic acid.

Among the above, a polycondensed compound of p-hydroxy benzoic acid, p-hydroxy-6-naphthoic acid, hydroquinone and terephthalic acid and a polycondensed compound of p-hydroxybenzoic acid, 2-hydroxy-6-naphthoic acid, hydroquinone, 2,6-naphthalenedicarboxylic acid are preferable.

Melting peak of LCP(A) is equal to or higher than 310° C. and preferably, from about 315° C. to about 380° C.

The preferable wholly aromatic liquid crystalline polyester resins used as LCP(B) in the present invention are copolymers composed of two monomers, p-hydroxy benzoic acid (PHB) and p-hydroxy-6-naphthoic acid (BON6) having melting peak of equal to or lower than 300° C. The ratio of PHB/BON6 is preferably in the range about 75/25–65/35.

Melting peak of LCP(B) is equal to or lower than 300° C. and preferably, from about 200° C. to about 295° C.

By compounding LCP(B) into LCP(A), the melt flowability of LCP(A) is improved while the heat-stability, mechanical property and heat resistance of the molded article prepared by using the combined composition are maintained as of the original LCP(A).

Especially preferable LCP(A)s and LCP(B)s are those composed of the monomers listed in table 1 below:

TABLE 1

Examples of monomer component of LCP(A)s and LCP(B)

| LCPs | | LCP(A) | | | | | LCP(B) |
|---|---|---|---|---|---|---|---|
| | | ① | ② | ③ | ④ | ⑤ | ⑥ |
| monomers | PHB | ○ | ○ | ○ | ○ | ○ | ○ |
| | BON6 | ○ | ○ | — | ○ | — | ○ |
| | HQ | ○ | ○ | ○ | — | — | — |
| | BP | — | — | ○ | ○ | ○ | — |
| | TPA | ○ | — | ○ | ○ | ○ | — |
| | IPA | — | — | — | — | ○ | — |
| | NDA | — | ○ | ○ | — | — | — |
| | PAP | — | — | — | ○ | — | — |

Abbreviations:
PHB: p-hydroxybenzoic acid
BON6: 2-hydroxy-6-naphthoic acid
HQ: hydroquinone
BP: 4,4'-biphenol
TPA: terephthalic acid
IPA: isophthalic acid
NDA: 2,6-naphthalenedicarboxylic acid
PAP: p-aminophenol The LCP(A)s and LCP(B)s used in the present invention may be prepared by any known method for synthesizing polyesters such as direct polycondensation, interesterification, molten acidlysis or conventional solution polymerization as well as slurry polymerization methods. Among them, molten acidlysis is preferably used to prepare LCPs. In this method, the monomers are heated together in the absence of heat exchange fluid to give molten solution and subsequently reacted to give molten liquid crystalline polyester. In order to facilitate the removal of volatile materials, such as acetic acid or water, which generate during the reaction, the reaction pressure may be reduced at the final stage of the reaction.

The LCP preparation process may be carried out with or without a catalyst. Examples of the catalysts which may be used herein include organic tin compounds such as dialkyltin oxide (ex. dibutyl tin oxide) and diaryltin oxide; organic titanium compounds such as titanium dioxide, alkoxytitanium silicate and titanium alkoxide; antimony trioxide; alkali or alkaline earth metal salt of carboxylic acid such as potassium acetate, sodium acetate and zinc acetate; and gaseous acid catalysts such as Lewis acid (ex. $BF_3$) and halogenated hydrogen (ex. HCl).

The amount of the catalyst added to the reaction may be 0.001–1 wt %, preferably 0.01–0.2 wt % of the total monomers. The molecular weight of thus obtained wholly aromatic liquid crystalline polyester resin may be increased by solid-phase polymerization comprising the step of heating the obtained resin under a reduced pressure or an inert atmosphere.

Further a molecular weight modifier may be employed, if desired, to control the molecular weight of the LCP. Molecular weight modifier may be a mono-functional phenol or carboxylic acid such as phenol, p-tert-butylphenol or benzoic acid, which may be admixed with the polycondensation reaction as a polymerization inhibitor to stop excess polymerization. Alternatively, molecular weight may be modified by adding excess amount of dicarboxylic acids or bivalent phenols selected from the above list of the monomers into the reaction.

The wholly aromatic liquid crystalline polyester resin composition of the present invention may be admixed with, if desired, one or more organic or inorganic fillers, especially with inorganic fillers. The fillers may be in the form of fibrous, lamellar or particulate fillers. Examples of fibrous fillers may include glass fiber, asbestos fiber, silica fiber, silica-alumina fiber, zirconia fiber, boron nitride fiber, silicon nitride fiber, boron fiber and potassium titanate fiber. Among the above, glass fiber is preferably used.

Examples of particulate fillers include carbon black, graphite, silica, quartz powder, glass beads, milled glass fiber, glass balloon, glass powder, silicates such as calcium silicate, aluminum silicate, kaoline, talc, feldspar powder, clay, acid clay, agalmatolite clay, sericite, sillimanite, bentonite, slate powder, diatomite, wollastonite and silane; metal oxides such as ferric oxide, titanium oxide, zinc oxide, antimony trioxide and alumina, metal carbonates such as calcium carbonate, magnesium carbonate, barium carbonate, whitewash and dolomite, metal sulfates such as barite powder, blanc fix, calcined gypsum, sedimentary potassium sulfate and barium sulfate; hydroxides such as hydrated alumina and aluminum hydroxide; sulfides such as molybdenum disulfide; and other powders such as ferrite, silicon carbide, silicon nitride, boron nitride, aluminum borate, alumina, antimony oxide, iron powder, magnesia, zinc flower, silica sand and white carbon.

Examples of lamellar fillers may include mica and glass flakes.

The most preferable filler used in the wholly aromatic liquid crystalline polyester resin composition of the present invention is glass fiber and it may be used in combination with other fillers, such as talc and the like, based on practical requirement. The size of the fillers is not limited and may be selected according to the required performance of the product.

The amount of the fillers to be added may be 1–80 wt %, preferably 5–60 wt % and more preferably 10–50 wt % based on the total amount of the wholly aromatic liquid crystalline polyester resin composition. If desired, greige goods or surface treating agent may be used simultaneously with the inorganic fillers.

Further, the resin composition of the present invention may further comprises known additives such as anti oxidants, thermal stabilizing agent, ultraviolet absorbing agent, lubricant, mold releasing agent, pigments, dyes, antistatic agents, surface active agents, fire retardants and the like.

The wholly aromatic liquid crystalline polyester resin composition of the present invention may be prepared by any suitable method from the above described LCP(A) and LCP(B), inorganic fillers and the other additives.

Example of the method may include;

1) LCP(A) and LCP(B) are admixed with fillers respectively and then blended together by means of an extruder.
2) Pellets of LCP(A) and LCP(B) are admixed with fillers respectively, then the pellets are dry-blended together and then, are directly molded.
3) LCP(A) and LCP(B), each of them contains no fillers, and a predetermined amount of fillers are loaded into an extruder to blend them together.

In the above methods, the blending step may be carried out with any conventional device such as extruder, kneader or the like.

The wholly aromatic liquid crystalline polyester resin composition of the present invention may comprise other resins in addition to LCP(A) and LCP(B) to the extent that the mechanical characteristics as well as soldering heat resistance of the molded article prepared by using the resulting resin composition are maintained.

By compounding 3–40 parts by weight of LCP(B) into 97–60 parts by weight of LCP(A), the resulting resin composition exhibit an improved melt flowability and provides a molded article having an excellent heat resistance.

In the present specification and claims, the term "improved melt flowability" means the resin composition of the present invention exhibits a better melt flowing property than that of a resin composition comprising LCP(A), a liquid crystalline polyester resin having melting peak equal to or higher than 310° C., as only liquid crystalline polyester component of the composition.

The improved melt flowability may be confirmed by the following method. The melt viscosity of the resin composition at the temperature of 310° C., i.e. the temperature at which LCP(A) starts to solidify, is compared with the melt viscosity of the same composition at 350° C., i.e. the temperature at which LCP(A) is usually molded are compared. The melt viscosity of the resin composition is measured at shear rate of 1000 $sec^{-1}$. When the ratio of the melt viscosity at 310° C. to that at 350° C. is higher, that is, the range of increased viscosity from 350° C. to 310° C. is larger, the flow resistance of the molten resin composition becomes higher and therefore the melt flowability is evaluated as lower. In such a condition, the molten resin composition sets faster. To the contrarily, when the ratio of the melt viscosity at 310° C. to that at 350° C. is lower, that is, the range of the increased viscosity from 350° C. to 310° C. is smaller, the setting time of the resin composition becomes longer and therefore, the melt flowability is evaluated as higher.

For example, LCP(A) alone exhibits melt viscosity at 310° C. more than ten times of that of at 350° C., and the melt viscosity of the composition obtained by blending a certain amount of LCP(B) into the LCB(A) exhibits melt viscosity at 310° C. less than ten times of that of at 350° C. Accordingly, thus obtained resin composition of the present invention exhibits an improved melt flowability as well as prolonged setting time.

According to the present invention, a heat-resistant liquid crystalline polyester resin composition which has an improved melt flowability and can provide a molded article having heat-resistance enough to be processed with reflow-soldering, is provided.

The present invention also provides a molded article obtained from the wholly aromatic liquid crystalline resin composition of the present invention.

Examples of the molded articles may include, but not limited to, electric and electronic parts and precision components such as connectors, relay devices, switch devices such as tact switches, coil bobbin, volume controlling devices and parts for motors, optical-pickup devices, quartz crystal devices and IC tips. According to the present invention, the molded articles may be prepared with the composition of the present invention by means of any method known in the art. According to the present invention, thinner and smaller molded articles can be provided than ever.

EXAMPLES

The present invention will be further illustrated with the following examples. The present invention is not limited to those examples.

1) Preparation of LCPs

The monomer components shown in table 2 below were fed in a reaction container (2L) equipped with an agitating blade and a condenser, and the deacetic acid polycondensation reaction was carried out by the following condition.

The reaction container containing the monomers was heated from 40° C. to 190° C. over 3 hours under nitrogen gas atmosphere, and kept at the temperature for 1 hour and then heated to 325° C. over 2 hours and then reacted for 10 minutes.

After that, the pressure was reduced to 20 mmHg at 325° C. over 20 minutes and then reacted for more 5 minutes to complete the polycondensation reaction. At the end of the reaction, approximately theoretical amount of acetic acid was distilled out. Accordingly, the wholly aromatic liquid crystalline polyester resins of LCP(A) ①–⑤ and LCP(B) (⑥) were obtained.

TABLE 2

| | | Monomers used to prepare LCPs (g) | | | | | |
|---|---|---|---|---|---|---|---|
| | | LCP(A) | | | | | LCP(B) |
| LCPs | | ① | ② | ③ | ④ | ⑤ | ⑥ |
| monomers | PHB | 116 | 118 | 166 | 166 | 166 | 193 |
| | BON6 | 60 | 23 | — | 15 | — | 113 |
| | HQ | 46 | 29 | 18 | — | — | — |
| | BP | — | — | 45 | 45 | 74 | — |
| | TPA | 70 | — | 46 | 60 | 50 | — |
| | IPA | — | — | — | — | 17 | — |
| | NDA | — | 56 | 6 | — | — | — |
| | PAP | — | — | — | 9 | — | — |

Abbreviations
PHB: p-hydroxybenzoic acid
BON6: 2-hydroxy-6-naphthoic acid
HQ: hydroquinone
BP: 4,4'-biphenol
TPA: terephthalic acid
IPA: isophthalic acid
NDA: 2,6-naphthalenedicarboxylic acid
PAP: p-aminophenol 2) Determination of Melting Peak Melting peak of the wholly aromatic liquid crystalline polyester resins 1–6 obtained above were determined respectively. The measurement was carried out with differential scanning calorimeter DSC-6200 (Seiko Instruments Inc., Chiba, Japan) at the sensitivity of 1.6 $\mu$W. In more detail, the obtained LCP was divided into fine particles and each 20 mg of the LCP powder was weighed. The weighed powder was heated from 50° C. to 375° C. at the rate of 20° C./minute and kept at 375° C. for 10 minutes (Step 1). Then the composition was cooled to 50° C. at the rate of 20° C./minute (Step 2) and then, heated again to 395° C. at the same rate (Step 3). Endothermic peak found in the Step 3 was recorded as melting peak. Results are shown in Table 3 below.

TABLE 3

| Melting Peaks of LCPs used in examples and comparative examples. | | | | | | |
|---|---|---|---|---|---|---|
| | LCP(A) | | | | | LCP(B) |
| LCPs | ① | ② | ③ | ④ | ⑤ | ⑥ |
| melting peak (° C.) | 333 | 321 | 339 | 343 | 343 | 280 |

3) Preparation of Resin Composition

The above-obtained LCPs ①–⑤ and glass fibers (10 $\mu$m diameter, 3 mm chopped-strand glass fiber) were pre blended together according to the ratio shown in the table 4 respectively. The mixture was put into twin-screw extruder (#PCM-30; IKEGAI Corporation, Kanagawa, Japan) and pelletized at 330° C. of cylinder temperature and 100 kg/hour of extrusion rate to give the resin compositions of Examples 1–11 and Comparative examples 1–9. The properties of the respective compositions were determined as below.

4) Flowability

Flowability of the molten composition was determined by means of Capirograph type 1A (Toyo Seiki Seisakusho, LTD, Tokyo, Japan) with capillary: L×D=10.00 mm×1.00 mm. The melt viscosity at 350° C. and 310° C. were determined at shear rate of 1000 sec$^{-1}$. The flowability was evaluated based on the melt viscosity ratio obtained by the formula:

melt viscosity ratio=melt viscosity at 310° C. (Pa·s)/melt viscosity at 350° C. (Pa·s).

As described above, the lower melt viscosity ratio means the higher flowability of the composition.

5) Mechanical Properties of Molded Article Prepared by Using the Resin Composition of the Present Invention According to the standard protocols, the resin compositions of the examples and comparative examples were molded into test strips and mechanical properties of the same were determined.

Tensile strength and breaking extension: ASTM-D-638

Flexural strength and flexural elasticity: ASTM D-790

Izot impact strength: ASTM D-256

Deflection temperature (DTUL): ASTM D-648

Reflow-soldering resistance: the strips were subjected to reflow-soldering and determined if they were resistant. The heart soldering conditions Device: IR Reflow Soldering Device Type SAI-2604

Test strip: ASTM D790

Soldering Condition: peak temperature of 240° C. for 5 sec

Strips: 5 strips per sample

Evaluation: dimensional change, swollenness and change of surface appearance of the strips were visually observed.

criteria: ◯: no change was observed in the 5 strips.
x~Δ: changes were observed in more than 1 strips.

Results are shown in table 4 below:

TABLE 4

| | resin composition | | | mechanical properties | | | | | | melting characteristics | | |
|---|---|---|---|---|---|---|---|---|---|---|---|---|
| | LCPs | ratio of LCPs (weight) | filler content *1 (wt %) | tensile strength (MPa) | breaking extension (%) | flexural strength (MPa) | flexural elasticity (GPa) | Izot impact strength (J/m) | deflection temperature (° C.) | reflow soldering | melt viscosity *2 350° C. (Pa · S) | melt viscosity *2 310° C. (Pa · S) | melt viscosity ratio *3 |
| Ex. 1 | (1) + (6) | (1):(6) = 90:10 | 30 | 189 | 1.7 | 211 | 13.7 | 93 | 244 | ○ | 33 | 205 | 6.2 |
| Ex. 2 | (1) + (6) | (1):(6) = 80:20 | 30 | 191 | 1.7 | 210 | 13.6 | 85 | 242 | ○ | 30 | 163 | 5.4 |
| Ex. 3 | (1) + (6) | (1):(6) = 70:30 | 30 | 198 | 1.8 | 216 | 13.7 | 74 | 241 | ○ | 31 | 102 | 3.3 |
| Ex. 4 | (2) + (6) | (2):(6) = 80:20 | 30 | 171 | 1.3 | 218 | 13.4 | 111 | 280 | ○ | 34 | 269 | 7.9 |
| Ex. 5 | (2) + (6) | (2):(6) = 70:30 | 30 | 175 | 1.4 | 214 | 13.2 | 96 | 264 | ○ | 33 | 254 | 7.7 |
| Ex. 6 | (3) + (6) | (3):(6) = 70:30 | 30 | 167 | 3.0 | 190 | 12.2 | 121 | 251 | ○ | 34 | 157 | 4.6 |
| Ex. 7 | (4) + (6) | (4):(6) = 70:30 | 30 | 142 | 2.4 | 202 | 13.8 | 110 | 254 | ○ | 32 | 118 | 3.7 |
| Ex. 8 | (5) + (6) | (5):(6) = 80:20 | 30 | 177 | 2.6 | 171 | 11.8 | 124 | 263 | ○ | 38 | 360 | 9.4 |
| Ex. 9 | (5) + (6) | (5):(6) = 70:30 | 30 | 185 | 2.6 | 178 | 12.0 | 132 | 259 | ○ | 35 | 320 | 9.1 |
| Ex. 10 | (1) + (6) | (1):(6) = 70:30 | 40 | 190 | 1.8 | 223 | 13.9 | 98 | 246 | ○ | 32 | 110 | 3.4 |
| Ex. 11 | (2) + (6) | (2):(6) = 80:20 | 40 | 169 | 1.5 | 185 | 12.7 | 54 | 277 | ○ | 38 | 281 | 7.4 |
| Comp. ex.1 | (1) | (1) = 100 | 30 | 190 | 1.6 | 209 | 13.7 | 88 | 245 | ○ | 37 | 650 | 18 |
| Comp. ex.2 | (1) | (1) = 100 | 40 | 176 | 1.6 | 203 | 13.7 | 68 | 251 | ○ | 40 | 670 | 17 |
| Comp. ex.3 | (2) | (2) = 100 | 30 | 165 | 1.5 | 216 | 13.7 | 108 | 285 | ○ | 42 | 720 | 17 |
| Comp. ex.4 | (2) | (2) = 100 | 40 | 168 | 1.5 | 207 | 13.7 | 88 | 287 | ○ | 44 | 810 | 18 |
| Comp. ex.5 | (3) | (3) = 100 | 30 | 150 | 2.7 | 170 | 12.0 | 120 | 265 | ○ | 43 | 750 | 17 |
| Comp. ex.6 | (4) | (4) = 100 | 30 | 127 | 2.0 | 189 | 13.7 | 108 | 265 | ○ | 38 | 460 | 12 |
| Comp. ex.7 | (5) | (5) = 100 | 30 | 164 | 5.0 | 153 | 11.3 | 137 | 284 | ○ | 49 | 1070 | 22 |
| Comp. ex.8 | (1) + (6) | (1):(6) = 50:50 | 30 | 199 | 1.9 | 220 | 13.9 | 107 | 233 | X~Δ | 31 | 64 | 2.1 |
| Comp. ex.9 | (2) + (6) | (2):(6) = 50:50 | 30 | 172 | 1.6 | 211 | 13.6 | 115 | 239 | Δ | 48 | 159 | 3.3 |

*1: Glass fillers were used. The filler contents are represented at % by weight of the total amount of the resin composition.
*2: Melt viscosity at shear rate of 1000 sec$^{-1}$.
*3: Melt viscosity ratio (at shear rate of 1000 sec$^{-1}$) = ηmelt(310° C.)/ηmelt(350° C.)

The original flowability of LCP(A)s (LCPS (1)–(5) only admixed with fillers, comparative examples 1–2, 3–4, 5, 6 and 7 respectively) were significantly improved by adding the specific amount of LCP(B). As shown in examples 1–3, as the amount of the added LCP(B) was increased, the flowability of the obtained resin composition was improved. This trend were apparent also in examples 4 and 5 as well as examples 8 and 9. By comparing examples 3 and 10 as well as Examples 4 and 11, it can be said that, the trend was kept unchanged if the amount of the filler was changed.

However, too much LCP(B) made the deflection temperature of the molded article lower to the extent not suitable for reflow-soldering (comparative examples 8 and 9).

What is claimed is:

1. A wholly aromatic liquid crystalline polyester resin composition comprising
   about 97–60 parts by weight of a wholly aromatic polyester resin (A) having melting peak determined by differential scanning calorimetry equal to or higher than 310° C.; and
   about 3–40 parts by weight of a wholly aromatic polyester resin (B) having melting peak determined by differential scanning calorimetry equal to or lower than 300° C. provided that the resin (A) is a copolymer composed of p-hydroxybenzoic acid, 2-hydroxy-6-napthoic acid, hydroquinone and terephthalic acid, or a copolymer composed of p-hydroxybenzoic acid, 2-hydroxy-6-napththoic acid, hydroquinone and 2,6-naphthalenedicarboxylic acid; and the resin (B) is a copolymer composed of p-hydroxy benzoic acid and 2-hydroxy-6-naphthoic acid.

2. The resin composition of claim 1, further comprising an inorganic filler in an amount of 1–80% by weight of the total amount of the resin composition.

3. A molded article obtained by molding the liquid crystalline polyester resin composition of claim 1.

4. A method to improve flowability of a wholly aromatic liquid crystalline polyester resin (A) having melting peak determined by differential scanning calorimetry equal to or higher than 310° C.; comprising the step of compounding 3–40 parts by weight of a holly aromatic liquid crystalline polyester resin (B) having melting peak determined by differential scanning calorimetry equal to or lower than 300° C. into 97–60 parts by weight of the quid crystalline polyester resin (A) to give a resin composition provided that the resin (A) is a copolymer composed of p-hydroxybenzoic acid, 2-hydroxy-6-naphthoic acid, hydroquinone and terephthalic acid, or a copolymer composed of p-hydroxybenzoic acid 2-hydroxy-6-naphthoic acid, hydroquinone and 2,6-naphthalenedicarboxylic acid;
   and the resin (B) is a copolymer composed of p-hydroxy benzoic acid and 2-hydroxy-6-naphthoic acid.

5. The method of claim 4, further comprising the step adding an inorganic filler 1–80% by weight of the total amount of the resin composition.

* * * * *